United States Patent [19]

Ragan

[11] Patent Number: 5,518,969
[45] Date of Patent: May 21, 1996

[54] PROCESS FOR PRODUCING LOW SHRINK CERAMIC COMPOSITION

[76] Inventor: Randall C. Ragan, 5225 La Granada, Rancho Santa fe, Calif. 92067

[21] Appl. No.: 420,640

[22] Filed: Apr. 12, 1995

Related U.S. Application Data

[63] Continuation of Ser. No. 269,539, Jul. 1, 1994, abandoned, which is a continuation-in-part of Ser. No. 23,104, Feb. 26, 1993, abandoned, which is a continuation-in-part of Ser. No. 902,013, Jun. 22, 1992, abandoned.

[51] Int. Cl.$^6$ ................................................. C03C 14/00
[52] U.S. Cl. .................. 501/32; 501/19; 264/56; 264/60; 428/432; 428/433; 428/688
[58] Field of Search .................... 501/15, 17, 19, 501/32; 156/89; 264/56, 60, 61; 75/233, 235, 252; 428/426, 432, 433, 688

[56] References Cited

U.S. PATENT DOCUMENTS

| | | | |
|---|---|---|---|
| 4,289,719 | 9/1981 | McIntosh et al. | 264/61 |
| 4,748,136 | 5/1988 | Mahulikar et al. | 501/32 |
| 4,867,935 | 9/1989 | Morrison, Jr. | 156/89 |
| 4,883,778 | 11/1989 | SingDoe et al. | 501/19 |
| 4,906,596 | 3/1990 | Joslin et al. | 501/32 |
| 5,102,720 | 4/1992 | Raj | 428/426 |

*Primary Examiner*—Karl Group
*Assistant Examiner*—Michael Marcheschi
*Attorney, Agent, or Firm*—Arnold Grant

[57] ABSTRACT

This invention provides a hard, strong ceramic body and method of manufacture whereby the body, after being formed into the desired shape and size can then be fired into a monolithic structure without any shrinkage or distortion during the firing operation. The "green," unfired ceramic composition comprises one or more powdered refractories and one or more powdered glasses which have a melting point below the softening point of the selected refractory material. Preferred refractories are alumina and zirconia; preferred glasses are lead borosilicate and barium borosilicate. The composition may also contain a metal powder.

7 Claims, No Drawings

PROCESS FOR PRODUCING LOW SHRINK CERAMIC COMPOSITION

This application is a continuation of U.S. application Ser. No. 08/269,539, filed Jul. 1, 1994, now abandoned which is a continuation-in-part of U.S. application Ser. No. 08/023,104, filed Feb. 26, 1993, now abandoned which is a continuation-in-part of U.S. application Ser. No. 07/902,013, filed Jun. 22, 1992, now abandoned.

FIELD OF THE INVENTION

The present invention relates to ceramic compositions which do not change their size or shape after firing. More particularly the present invention relates to a ceramic composition comprising a refractory powdered ceramic and a glass powder having a particular size range which will shrink less than two percent, preferably less than one half of one percent (0.5%) in going from the unfired "green" state to the fired state.

BACKGROUND

The inherent shrinkage experienced during firing in typical prior art ceramics can be as much as thirty percent. U.S. Pat. No. 5,102,720 reports that:

"The state-of-the-art in multilayer ceramic substrate technology has been represented by the IBM multilayer ceramic substrate as described in Blodgett, A. J. et al., IBM J. Res. Develop. 26,1, pp 30–36 (1982). . . . (That) substrate shrinks in the x, y and z directions during sintering, approximately 17% in each direction, and such shrinkage in the x-y plane may cause interface defects and delamination."

Conventional ceramic products are generally formed by the "green tape", "dry press" or "extrusion" process from pastes, powders or slurries of alumina or other ceramic materials mixed together with glass powders and organic solvents or solutes. The organics are volatilized at substantially lower temperatures than the firing or processing temperature of the ceramic bodies or substrates. Solvents usually evaporate at temperatures below about 100° C. and solutes evaporate at temperatures below about 450° C. The loss of the solute and solvent leaves pores in the green tape or cold pressed body. At the peak firing temperatures the glassy phase melts, a certain amount of sintering of the alumina particles occurs and there is a resulting filling of the voids or densification of the bodies. It is this densification which is a factor in shrinkage.

Investigation has also shown that shrinkage can be the result of mechanically and chemically combined water being driven off, evolution of gasses due to dissociation of raw materials, and formation of glasses and/or crystalline phases of higher specific gravity. The degree of change can also be affected by chemical composition, particle size, particle size distribution and particle shape of the raw materials, firing profile, ignition losses, and forming methods. It has recently been determined that the size distribution of the glass particles plays an important part in shrinkage and thus shrinkage control.

Equally as troublesome to workers in the field as the absolute amount of shrinkage is the extreme difficulty involved in predicting with any degree of certainty, what the actual percentage of shrinkage will be for a given lot or piece. For example, average shrinkage for a given composition and firing profile may be a certain percentage. However, it is just that, an average, and the actual shrinkage from lot to lot and piece to piece may vary by as much as plus or minus one or two or three percent or more from that average. Clearly, this is unacceptable when the design tolerances between two parts require a greater degree of precision.

This shrinkage and lack of predictability presents particular difficulties in the electronics industry where layers of "green" ceramic containing pre-set horizontal and vertical conductive pathways or vias, are stacked together and then fired. If the conductive pathways do not match up in the fired state as they did in the green state because of differing shrinkage rates for one or more of the layers, the resultant part either has to be reworked or scrapped; all of which adds unnecessary expense and time to the manufacturing process.

There have been several efforts to control or eliminate shrinkage by, e.g. pre-igniting or calcining the raw materials, reducing the binder and thus the void-causing volatile content, increasing forming pressures, controlling particle morphology, mechanically constraining the part to restrict shrinkage to the vertical plane, and by formulating with materials that form crystal phases which are larger than their precursors. Each approach has had varying degrees of success. However, no one has been able to consistently reduce firing-induced shrinkage to less than about two percent and preferably less than about one percent.

There thus exists the need for ceramic compositions with minimal shrinkage, i.e., less than two percent and preferably less than one percent, during the firing process. Equally as important there exists the need for ceramic compositions where the shrinkage from lot to lot and piece to piece is both predictable and substantially the same.

SUMMARY

The present invention solves each of the above problems and drawbacks in the prior art by providing a ceramic composition with a minimal and controllable amount of firing-induced shrinkage. The compositions of the present invention comprise one or more refractories and one or more glasses which have a melting point below the softening point of the selected refractory material. The refractory and glass materials are each in powdered form with the glass being coarse relative to the refractory. The particle size and particle size distribution of the glass is a critical feature of the present invention. The glass powder should have no more than about five percent of particles less than 10 microns. Preferably, there will be no particles less than 10 microns. It is also preferable that the amount and particle size range of the glass is selected such that when the glass and ceramic are mixed and then tightly compacted by the application of pressure the particles of glass will provide a "best fit" within and substantially fill the interstices between the particles of refractory. When the mixture is fired, it is believed that the glass particles melt and wick into the interstices between the refractory materials resulting in glass-lined impervious cavities which thereby provides structural integrity and prevents shrinking. Stated again, it is believed that the refractory materials form a skeleton and the glass particles, on firing, wick into the spaces between the refractory material "skeleton" and then, upon cooling, fuse.

DESCRIPTION

We have found that mixtures of one or more low temperature glasses and one or more refractory materials can be made to exhibit predictable shrinkages approaching zero percent. Any refractory material will work; the choice of refractory material or materials is based primarily on the physical, electrical and/or other properties desired in the resultant ceramic. E.g., strength, dielectric constant, thermal expansion, hermaticity, thermal conductivity, and performance at various frequencies, etc. The preferred refractories are those which can be fired in an oxidizing atmosphere. Suitable examples include alumina, zirconia, magnesia, calcium silicate, cordierite, stealite, mullite, silica, forsterite and mixtures thereof. The most preferred refractories are alumina, silica, forsterite, and mixtures of alumina and forsterite.

The refractory material should be in powder form, i.e., less than about 20 microns. The preferred size range is from about 0.1 to about 10 microns.

Any glass will work; as with the refractory material, the glass is also selected primarily for its physical, electrical and/or other properties. There are, however, four specific requirements: First and foremost there must be substantially no, i.e., less than about five percent of glass particles having a size of less than 10 microns. Preferably, all glass particles of less than 10 microns have been removed. Second, the glass or glasses must have a coefficient of thermal expansion equal to or less than that of the refractory. Third, the glass or glasses must have a melting point below the softening point of the refractory material. Finally, the particles of glass or glasses should at least partially wet, i.e. adhere to, and spread across immediately adjacent particles of the refractory material when the mixture is fired. This latter requirement aids in the bonding of the glass particles to the refractory particles and thus the refractory particles to each other. As will be explained in greater detail below, the combination of these requirements provides the structural integrity and zero shrinkage.

Examples of suitable glasses include lead silicate, lead borosilicate, lead borosilicate, barium borosilicate, soda-lime glass and mixtures thereof. The preferred glasses include lead borosilicate and barium borosilicate.

The glass should also be in powder form. As mentioned above, however, the particle size and distribution of the glass must be strictly controlled and there should be less than about five percent and preferably no particles having a size of less than 10 microns. Studies have shown that there is a dramatic increase in shrinkage in the x-y plane when there is more than about five percent of glass particles smaller than 10 microns present in the ceramic composition. Preferred particle sizes are from about 10 to about 100 microns. The most preferred particle sizes are from about 10 to about 50 microns because of the desirable surface characteristics for glass particles within this range. I.e., the larger the particle size the coarser is the particle and relatively smooth particles are preferred.

As stated, the melting point of the glass or mixture of glasses, should be less than the softening point of the refractory material or materials. Based on the above examples for refractory materials this would be a range of from about 400° C. to about 1000° C., preferably from about 700° C. to about 1000° C. and most preferably from about 800° C. to about 950° C.

The relative amounts of refractory and glass in the mixture is also largely dependent upon the physical, electrical and/or other properties desired in the resultant ceramic. In those ceramics where hermeticity is a consideration the amount of glass should be adjusted to produce zero absorption or hermeticity. When hermeticity is not a problem less glass may be used. A useful set of properties will usually be found in the range of from about 10 percent to about 60 percent glass, volume to volume, preferably from about 30 percent to about 50 percent glass, and from about 40 to about 90 percent refractory, preferably about 50 to about 70 percent refractory.

Preferably the mixture also contains a binder. Suitable examples are well known to those skilled in the art and would include thermoplastics such as a vinyl acetate-polyethylene copolymer emulsion sold by Air Products Corporation under the name Air Products 410, an acrylic resin dispersed in a volatile organic solvent such as methylene chloride, and polyvinyl butyral dispersed in a volatile organic solvent such as methylene chloride.

It is preferred to add a plasticizer to assist in the handling and forming of the green body. Examples of suitable plasticizers are also well known to those skilled in the art and would include butyl-benzyl phthalate and diallyl phthalate. As those skilled in the art appreciate the amount of plasticizer used is a function of the final condition required for the green body; the more pliability required, the greater the amount of plasticizer employed.

It is also desirable to add a small amount of a surfactant to aid in the dispersing of the binder and thus the forming of the green body. The particular choice of surfactant and whether it is anionic, cationic or non-ionic, is not critical. Similarly, the amount of surfactant is not critical. The selection of each is well within the skill of the art. A small amount of water may also be added. Particularly desirable thermal and electrical conductivity may be obtained for the resultant ceramic by the incorporation of a suitable metal powder as part of the refractory phase. Any conductive metal will work.

For applications where the ceramic composition is classified as an insulator, such as for electronic packaging components, the metallic particles are preferably provided in a weight percent so that they are discontinuously dispersed throughout the fired composite. Preferably the metal or metal alloy particles make up less than about fifty percent of the weight of the final fired composite. More preferably less than about thirty percent of the weight. Limiting the amount of the metallic particles is believed to prevent the formation of a continuous metal path in the final fired composite.

Even with discontinuously dispersed metallic particles the finally fired body exhibits improved thermal conductivity as compared to a composite containing only ceramic and glass. This is surprising since there is no corresponding increase in electrical conductivity.

Where electrical conductivity is desired the metal or metal alloy particles should make up more than about fifty percent of the weight of the final fired composite, preferably at least about fifty-five percent by weight. For example, a ceramic composition prepared according to the present invention and containing fifty-five percent by weight of silver powder exhibited an electrical conductivity of less than one ohm per square. For electrical conductivity aluminum, copper, gold, silver, platinum, and palladium are preferred. Gold, silver, platinum and palladium are particularly advantageous because they may be fired in an oxidizing atmosphere without loss of their metal characteristics. Aluminum, copper and other metals should be fired in a non-oxidizing atmosphere. The particle size for the metal powder should be in the range of from about 0.1 to about 6 microns, preferably from about 2 to about 5 microns.

The mixture of refractory and glass particles together with the binder, plasticizer and, if desired, metal powder, surfactant and water are intimately mixed and then formed into the selected shape and compacted under pressure.

The pressure should be sufficient to compact the particles or refractory material into their "best fit" and substantially fill the interstices between the refractory particles with glass particles. While not wishing to be bound by any particular theory, it is believed that the combination of substantially eliminating glass powder fines, i.e., particles less than 10 microns in combination with the "best fit" compaction and the structural integrity resulting from the intersticial glass particles as they go through the firing cycle, i.e., first melting and tightly adhering to the refractory material by wicking into the skeletal structure created by the refractory and then hardening, produces the very low (preferably zero) and controlled shrinkage.

Suitable pressures are from about 5,000 to about 200,000 PSI, preferably from about 50,000 to about 100,000 PSI. The pressure may, for example, be applied by a two-roll mill or by compression molding.

The green body may be formed by any known means. Spray drying will normally give the most predictable results, as well as being less subject to contamination. With this procedure sufficient water is added to the mixture to make a free flowing slurry which is, in turn, fed to a spray dryer to produce a free flowing spherical powder. Preferably about 6 percent water, by volume, is added to the powder which is then subjected to compaction. The resultant batch is ready for final forming into the desired shape and firing.

Two roll milling is another convenient method of preparation. It is preferred to use tungsten carbide coated rolls to prevent metal contamination. In this procedure, only enough water is added to the mixture of refractory, glass, binder and plasticizer to provide a stiff mud consistency. The mixture is placed on the rolls and milled until a smooth consistency is obtained. The resultant batch is then ready for final forming and firing.

Other methods will be readily apparent to those skilled in the art.

EXAMPLE I

A ceramic composition having the following formula was prepared:

| Aluminum oxide (Alcoa A-14) | 50 grams |
| Glass (10–40 microns) | 50 grams |
| Binder (emulsion at 50% solids in water | 20 grams |
| Surfactant (Darvan 821) | 0.5 grams |
| Water | as needed |

The composition was mixed treated in a two-roll mill with tungsten carbide coated rolls. The amount of water added was limited to that required to produce a stiff, mud like consistency. The rolls were in a horizontal configuration and milling continued until a smooth consistency was obtained. The resultant flat strap was further compacted by high shear to obtain the "best fit" of the refractory and glass particles and fired. Firing was from room temperature to 450° C., to burn out the organic binders, then linearly rising in temperature to 850° C. then holding at 850° C. for thirty minutes.

EXAMPLE II

A ceramic composition having the following formula was prepared:

| Zirconium Oxide | 50 grams |
| Glass (200–500 mesh) | 50 grams |
| Binder (emulsion at 50% solids in water) | 20 grams |
| Surfactant (Darvan 821) | 0.5 grams |
| Water | as needed |

The ingredients were combined and added to a sigma mixer and then a de-airing pug mill and then extruded in a flat strap of appropriate width and thickness. The resultant flat strap was further compacted by high shear into a tape having the "best fit" of refractory and glass particles and fired as in Example I.

EXAMPLE III

A ceramic composition having the following formula was prepared:

| Calcium silicate | 50 grams |
| Glass (10–40 microns) | 50 grams |
| Binder (emulsion at 50% solids in water) | 20 grams |
| Surfactant (Darvan 821) | 0.5 grams |
| Water | as needed |

The composition was mixed treated in a two-roll mill with tungsten carbide coated rolls. The amount of water added was limited to that required to produce a stiff, mud like consistency. The rolls were in a horizontal configuration and milling continued until a smooth consistency was obtained. The resultant flat strap was further compacted by high shear to obtain the "best fit" of the refractory and glass particles and fired. Firing was from room temperature to 450° C., linearly rising in temperature for four hours and then further rising in temperature to 850° C. then holding at 850° C. for thirty minutes.

EXAMPLE IV

A ceramic composition having the following formula was prepared:

| Silver powder (2–5 microns) | 55 grams |
| Aluminum oxide | 22.5 grams |
| Glass (10–40 microns) | 22.5 grams |
| Binder | 12 grams |
| Surfactant | 0.2 grams |
| Water | 6.0 grams |

The materials were mixed and dispersed on a two-roll mill and rolled to a final thickness of 0.007 inches, laminated in 4 layers and fired at 900° C. The resultant ceramic was electrically and thermally conductive.

To further demonstrate the wide range of ceramics and glasses that can be utilized according to the present invention the following combinations were prepared. Each was formed into a bar, measured in the green state, fired and then measured again to determine shrinkage.

| Refractory | Glass | Glass Content | x,y Average Shrinkage |
| --- | --- | --- | --- |
| Titanium oxide | soda-lime | 50% | 1.51% |
| Tin oxide | barium borosilicate | 50% | 1.08% |
| Tin oxide | soda-lime | 50% | 1.04% |
| Zinc oxide | barium borosilicate | 50% | 1.58% |
| Zinc oxide | soda-lime | 50% | 0.87% |
| Zinc oxide | lead borosilicate | 50% | 0.20% |
| Nickel oxide | lead borosilicate | 40% | 0.44% |
| Nickel oxide | barium borosilicate | 40% | 0.64% |
| Nickel oxide | soda-lime | 40% | 0.15% |

-continued

| Refractory | Glass | Glass Content | x,y Average Shrinkage |
|---|---|---|---|
| Chromium oxide | lead borosilicate | 40% | 0.43% |
| Chromium oxide | barium borosilicate | 40% | 0.35% |
| Chromium oxide | soda-lime | 40% | 0.19% |
| Aluminum-Nickel | soda-lime | 45% | 0.13% |
| Aluminum-Nickel | barium borosilicate | 45% | 0.07% |
| Tungsten oxide | barium borosilicate | 40% | 1.77% |
| Neodymium oxide | soda-lime | 40% | 0.92% |
| Neodymium oxide | barium borosilicate | 40% | 1.01% |
| Homium oxide | soda-lime | 40% | 0.10% |
| Homium oxide | lead borosilicate | 40% | 0.65% |
| Europium oxide | soda-lime | 50% | 0.62% |
| Europium oxide | lead borosilicate | 50% | 1.10% |
| Cerium oxide | soda-lime | 50% | 0.60% |
| Cerium oxide | barium borosilicate | 50% | 0.43% |
| Cerium oxide | lead borosilicate | 50% | 0.08% |
| Yttrium oxide | lead borosilicate | 50% | 0.17% |
| Samarium oxide | soda-lime | 50% | 1.00%; |
| Samarium oxide | barium borosilicate | 50% | 0.17% |
| Samarium oxide | lead borosilicate | 50% | 1.17% |
| Magnesium oxide | barium borosilicate | 50% | 1.12% |
| Alumina | barium borosilicate | 40% | 0.65% |
| Alumina | lead borosilicate | 40% | 0.81% |
| Calcium silicate | lead borosilicate | 52% | 0.82% |
| Calcium silicate | soda-lime | 54% | 1.25% |
| Zirconium oxide | soda-lime | 30% | 0.53% |
| Zirconium oxide | barium borosilicate | 50% | 0.50% |

There are many unique and distinct advantages from the use of ceramic compositions prepared in accordance with the present invention. For example, when forming a multi-layered electronic device each layer can be of a different composition, assuming a similar coefficient of thermal expansion, and thus have different electrical properties. Since each of the layers will have the same controlled shrinkage, there will be no delamination or distortion. Similarly, green tapes prepared from ceramic compositions prepared in accordance with the present invention can be laminated to and subsequently fired into previously fired ceramic or metal layers or articles. Because there is no shrinkage, there will also be no deleterious "bimetal strip" bending effect. Finally, the green tapes can be laminated into seam areas or vacuum formed to create articles of complex shapes and more particularly large complex shapes heretofore not possible.

As the present invention may be embodied in many forms without departing from the spirit or essential character and differing only in matters of detail, it should not be limited by the preceding description. The scope of the invention is to be determined solely by the appended claims.

I claim:

1. A process for making a ceramic body which will shrink less than two percent in the x-y plane in going from the green to the fired state consisting of the steps:

(a) forming a mixture comprising from about 40 to about 90 percent by volume of at least one refractory material that can be fired in an oxidizing atmosphere and from about 10 to about 60 percent by volume of glass particles, the refractory material having a particle size in the range of from about 0.1 to about 20 microns and the glass particles have a size greater than 10 microns and less than about 100 microns, the glass having a melting point below the refractory materials softening point, a coefficient of thermal expansion not greater than that of the refractory material, and the glass being able to adhere to and spread across immediately adjacent particles of refractory material when the mixture is fired;

(b) forming the mixture into a green body;

(c) compacting the green body by subjecting it to a pressure of from about 5000 PSI to about 200,000 PSI to thereby allow the glass particles to fit within and fill the interstices between the particles of refractory material; and, (d) firing the green body at a temperature in the range of from about 400° C. to about 1000° C.

2. The process according to claim 1 wherein the refractory material is selected from the group consisting of alumina, zirconia, magnesia, calcium silicate, cordierite, stealite, mullite, silica, forsterite and mixtures thereof.

3. The process according to claim 1 wherein the glass is selected from the group consisting of lead borosilicate, barium borosilicate, soda-lime, lead silicate, lead borosilicate and mixture thereof.

4. The process according to claim 1 wherein the refractory material is present from about 50 to about 70 percent by volume and is selected from the group consisting of alumina, silica, forsterite and mixtures thereof and the glass particles are present from about 30 to about 50 percent by volume and are selected from the group consisting of lead bisilicate and barium borosilicate.

5. The process according to claim 1 wherein the glass has a particle size of from 10 to about 50 microns.

6. The process according to claim 1 wherein the mixture further comprises a metal powder having a particle size of from about 0.5 to about 6 microns.

7. The process according to claim 6 wherein the metal is selected from the group consisting of aluminum, copper, silver, gold, platinum and palladium.

* * * * *